United States Patent
Maliskey et al.

(10) Patent No.: US 10,118,571 B2
(45) Date of Patent: Nov. 6, 2018

(54) EXTERIOR APPLIQUE WITH INTERCHANGEABLE INSERTS

(71) Applicant: COOPER-STANDARD AUTOMOTIVE INC., Novi, MI (US)

(72) Inventors: Thomas E. Maliskey, Marine City, MI (US); Rod Bara, Rochester Hills, MI (US)

(73) Assignee: COOPER-STANDARD AUTOMOTIVE INC., Novi, MI (US)

( * ) Notice: Subject to any disclaimer, the term of this patent is extended or adjusted under 35 U.S.C. 154(b) by 0 days.

(21) Appl. No.: 15/254,868

(22) Filed: Sep. 1, 2016

(65) Prior Publication Data
US 2017/0057429 A1 Mar. 2, 2017

Related U.S. Application Data

(60) Provisional application No. 62/213,325, filed on Sep. 2, 2015.

(51) Int. Cl.
| | |
|---|---|
| *B60R 13/04* | (2006.01) |
| *B62D 25/04* | (2006.01) |
| *B60R 13/00* | (2006.01) |
| *B60R 13/02* | (2006.01) |
| *B60J 10/265* | (2016.01) |

(52) U.S. Cl.
CPC ............. *B60R 13/04* (2013.01); *B60J 10/265* (2016.02); *B60R 13/005* (2013.01); *B60R 13/0206* (2013.01); *B62D 25/04* (2013.01)

(58) Field of Classification Search
CPC ..... B60R 13/005; B60R 13/04; B60R 13/043; B60R 13/0206; B62D 25/04; F16B 5/12

USPC ............................................ 296/1.08, 193.06
See application file for complete search history.

(56) References Cited

U.S. PATENT DOCUMENTS

| | | |
|---|---|---|
| 3,388,523 A | 6/1968 | Evans |
| 3,441,305 A | 4/1969 | Trammell, Jr. |
| 3,775,927 A | 12/1973 | Meyer |
| 4,066,285 A | 1/1978 | Hall et al. |
| 4,175,303 A | 11/1979 | Benedetti |
| 4,353,584 A | 10/1982 | Lovett |
| 5,014,934 A | 5/1991 | McClaflin |
| 5,188,408 A | 2/1993 | Berdan et al. |
| 5,353,571 A | 10/1994 | Berdan et al. |
| 5,639,522 A | 6/1997 | Maki et al. |
| 5,964,496 A | 10/1999 | Nozaki et al. |
| 6,409,256 B1 | 6/2002 | Page |
| 6,681,543 B2 | 1/2004 | Nada et al. |
| 7,717,458 B2 | 5/2010 | Tsuge |
| 8,070,204 B2 | 12/2011 | Mourou |
| 8,393,058 B2 | 3/2013 | Okada et al. |
| 8,763,212 B2 | 7/2014 | Scroggle et al. |

(Continued)

OTHER PUBLICATIONS

PCT/US2016/049976, International Search Report and Written Opinion, dated Nov. 17, 2016.

(Continued)

*Primary Examiner* — Jason S Daniels
(74) *Attorney, Agent, or Firm* — Fay Sharpe LLP (57) ABSTRACT

An interchangeable applique assembly for an associated vehicle is disclosed. The applique assembly includes a base member or substrate dimensioned to cover a pillar of the associated vehicle. An applique insert is received on the base member and at least partially covers an outwardly facing surface of the base member. A fastener secures the applique insert to the base member.

16 Claims, 6 Drawing Sheets

(56) References Cited

U.S. PATENT DOCUMENTS

| | | |
|---|---|---|
| 2004/0160078 A1 | 8/2004 | Hwang |
| 2007/0075531 A1 | 4/2007 | Tsuge |
| 2007/0164585 A1 | 7/2007 | Hasegawa et al. |
| 2007/0182191 A1 | 8/2007 | Wright |
| 2008/0136216 A1 | 6/2008 | Teng |
| 2009/0066062 A1 | 3/2009 | Miyamoto et al. |
| 2009/0256372 A1 | 10/2009 | Nedelman |
| 2013/0186018 A1 | 7/2013 | Grandgirard et al. |
| 2014/0367946 A1 | 12/2014 | Osterhout |

OTHER PUBLICATIONS

Zahl, T., "Chrome Trim: Overlay vs. Replacement", www.carid.com/articles/chrome-trim-overlay-vs-replacement.html Aug. 26, 2015 (retrieved from internet on Oct. 26, 2016).

EXTERIOR APPLIQUE WITH INTERCHANGEABLE INSERTS

This application claims the priority benefit of U.S. provisional application Ser. No. 62/213,325, filed Sep. 2, 2015, the entire disclosure of which if incorporated herein by reference.

BACKGROUND

The present disclosure relates to automotive vehicles, and more particularly with respect to trim components associated therewith. There is shown and described herein in exterior appliqué with interchangeable inserts, although aspects thereof may find application related environments.

It is known in the art to provide automotive vehicles with different vehicle styling options and/or requirements. Heretofore, such arrangements provided unique structural components depending on the desired vehicle styling or trim level option. For example, one customer may desire an upper-level trim component such as a bright strip (e.g. metallic such as stainless steel trim components), while in other instances a different trim level such as the high-gloss or low gloss style may be desired. Although used on the same vehicle slightly different structural components are required to achieve these different trim levels.

Consequently, a need exists for greater flexibility in design to satisfy different customer needs for bright, high-gloss, or low gloss styling requirements. Preferably, the greater flexibility is achieved without sacrificing cost, complexity, or functionality.

SUMMARY

An interchangeable applique assembly for an associated vehicle is disclosed.

The applique assembly includes a base member or substrate dimensioned to cover a pillar of the associated vehicle. An applique insert is received on the base member and at least partially covers an outwardly facing surface of the base member. A fastener secures the applique insert to the base member.

The applique insert is one of dimensionally similar, at least first and second appliques having different surface finishes.

The at least one of first and second applique inserts are formed from dissimilar materials.

The applique insert includes an opening dimensioned to receive the fastener.

The base member includes an opening therethrough that is dimensionally aligned with the applique insert opening so that the fastener is received through the base member opening and the applique insert opening, and the fastener secures the applique assembly to the associated vehicle.

The opening has a greater dimension in a first direction than in a second direction whereby the fastener has an elongated base that is dimensioned for receipt through the opening in the first direction only.

The base member includes an elongated recess dimensioned to receive the applique insert therein.

The base member includes a seal lip extending along a first perimeter edge.

The fastener includes an elongated head that fits through aligned, similar shaped openings in the base member and the applique insert.

The base member has a first surface configured for covering receipt on an associated pillar of the vehicle, and a second surface facing outwardly from the vehicle, the second surface including the elongated recess.

The base member has a recess width less than a width of the base member.

The applique insert has a groove disposed adjacent to and substantially perpendicular to the elongated dimension of the opening in the applique insert.

A primary advantage of the disclosure is the flexibility offered to the manufacturer.

Another benefit resides in the ability to change out different inserts for styling requirements.

Still another advantage is found in the ease of assembly of the components.

Other benefits and advantages of the present disclosure will become more apparent from reading and understanding the following detailed description.

DETAILED DESCRIPTION

Figure 1:
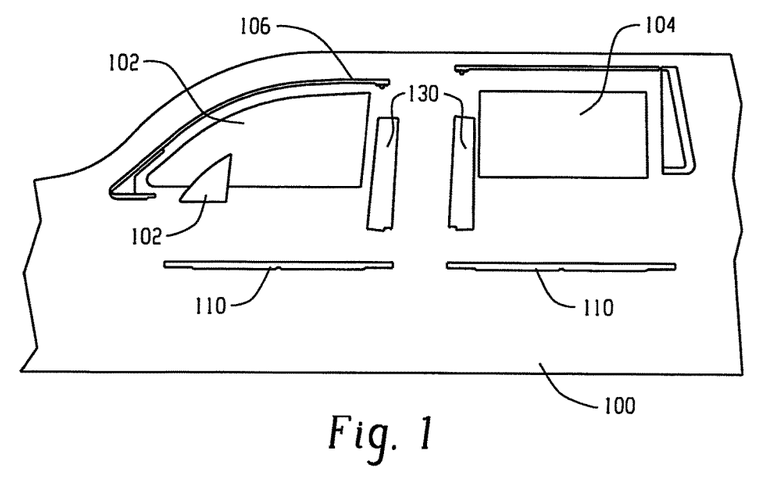
FIG. 1 is an elevational view of a portion of an automotive vehicle, specifically illustrating front and rear windows on one side of the vehicle.
Figure 2:
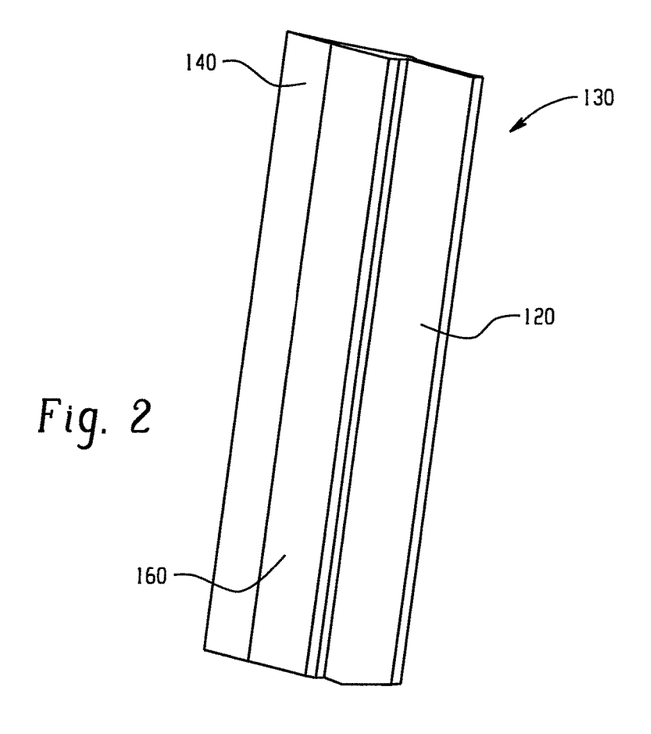
FIG. 2 is a perspective view of a vehicle trim assembly, namely an exterior appliqué, with interchangeable inserts.
Figure 3:
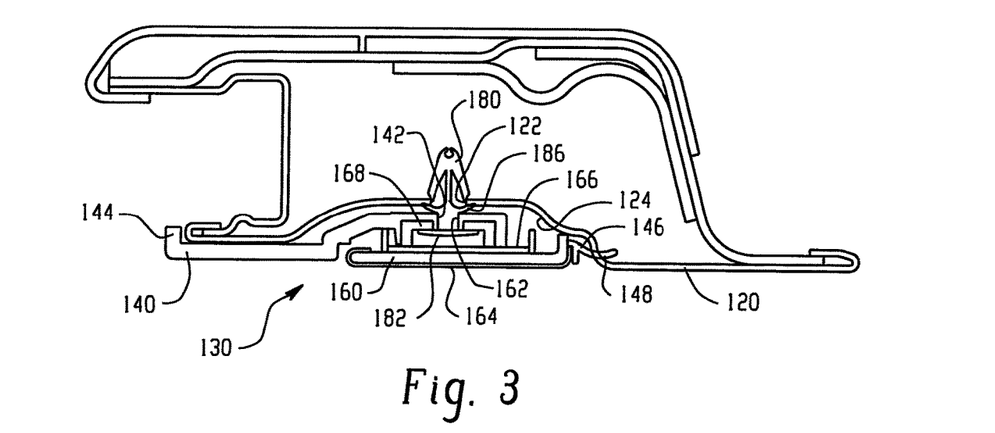
FIG. 3 is a cross-sectional view of the vehicle trim assembly of FIG. 2 using a first insert.
Figure 4:
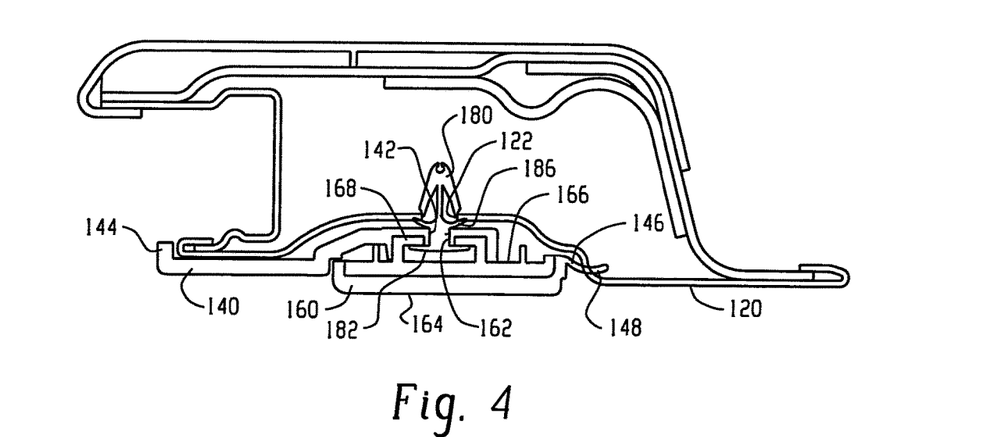
FIG. 4 is a cross-sectional view of the vehicle trim assembly of FIG. 2 using a second insert.

Turning to FIGS. 1-8, automotive vehicle 100 includes a first or front movable window 102 and a second or rear movable window 104. A still greater number of vehicle windows could be provided, although illustration of FIG. 1 is sufficient for purposes of showing and describing the present disclosure. Conventional weatherstrip or trim components (e.g. header weatherseal 106, mirror sail 108, beltline weatherseal 110) are provided around one or both of the windows 102, 104 in a manner that is generally conventionally known in the art.

Figure 5:
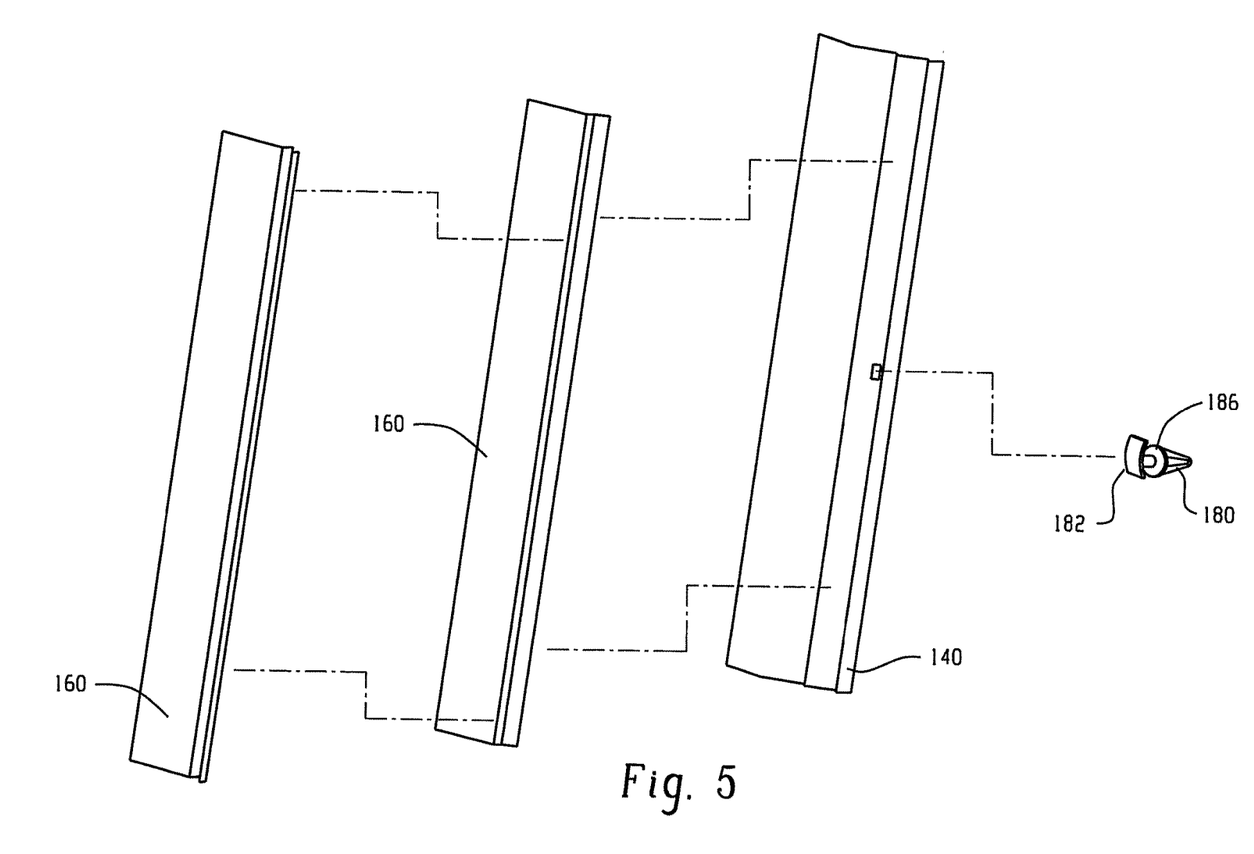
FIG. 5 is an exploded perspective view of the vehicle trim assembly of FIG. 2.
Figure 6:
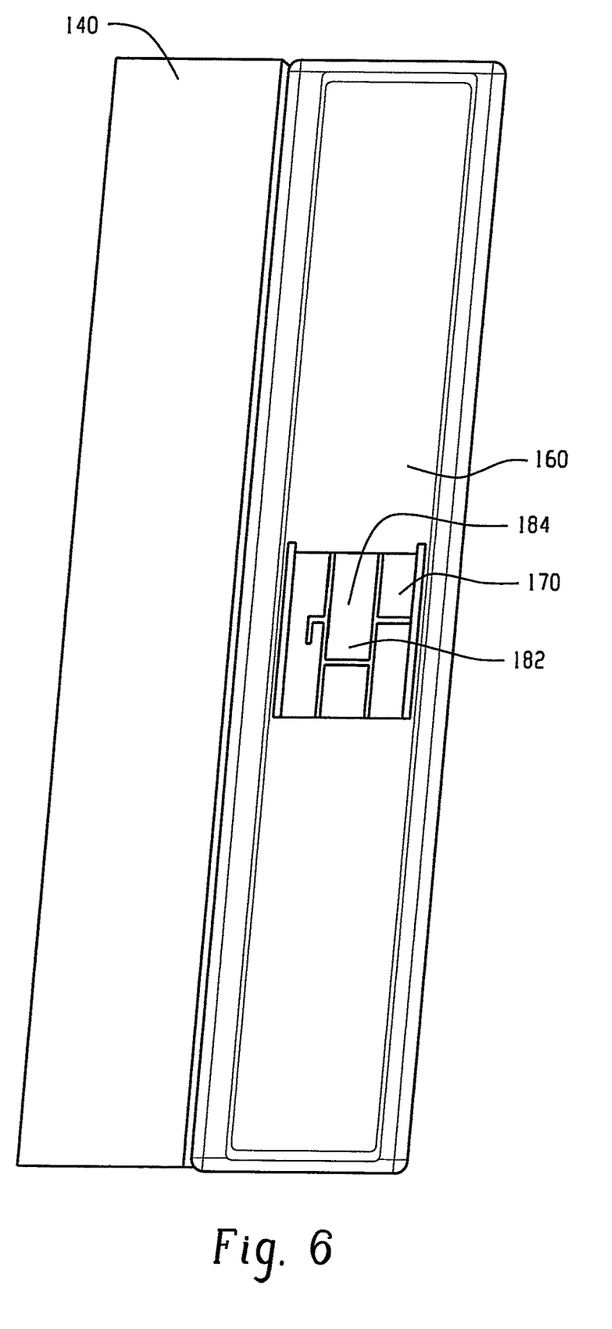
FIG. 6 is a rear perspective view of the vehicle trim assembly of FIG. 2.
Figure 7:
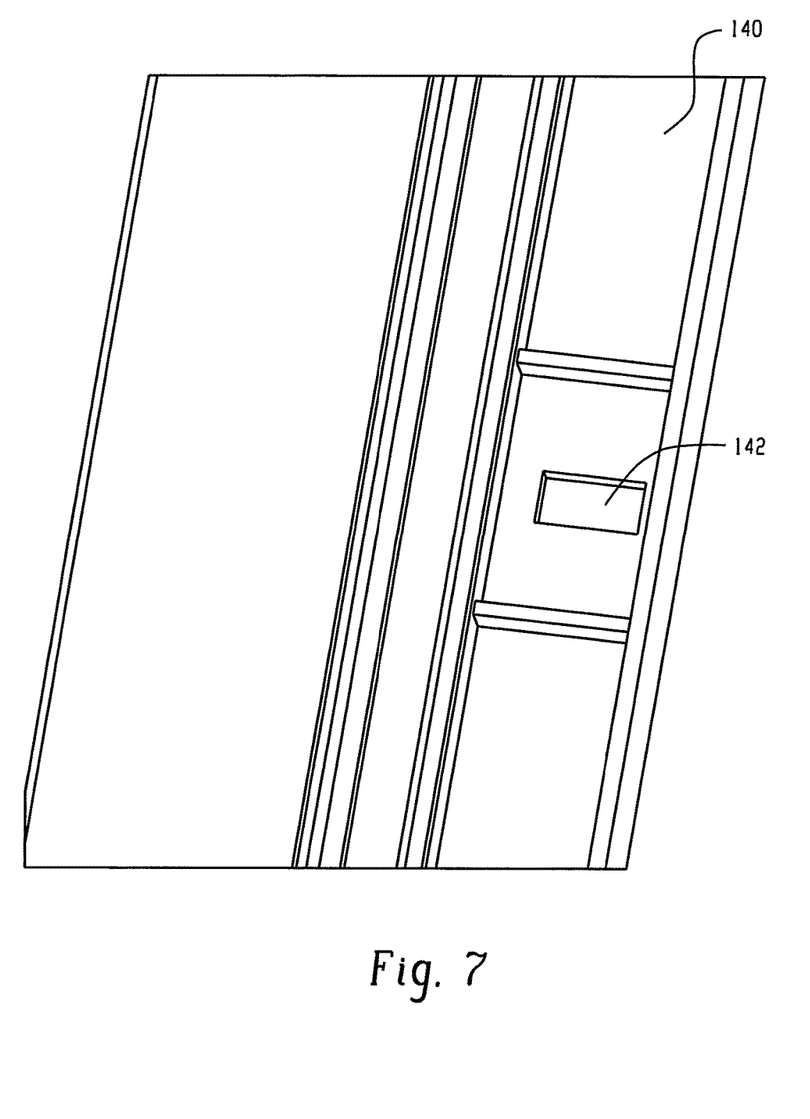
FIG. 7 is an enlarged view of the rear portion of the vehicle trim assembly shown in FIG. 6.
Figure 8:
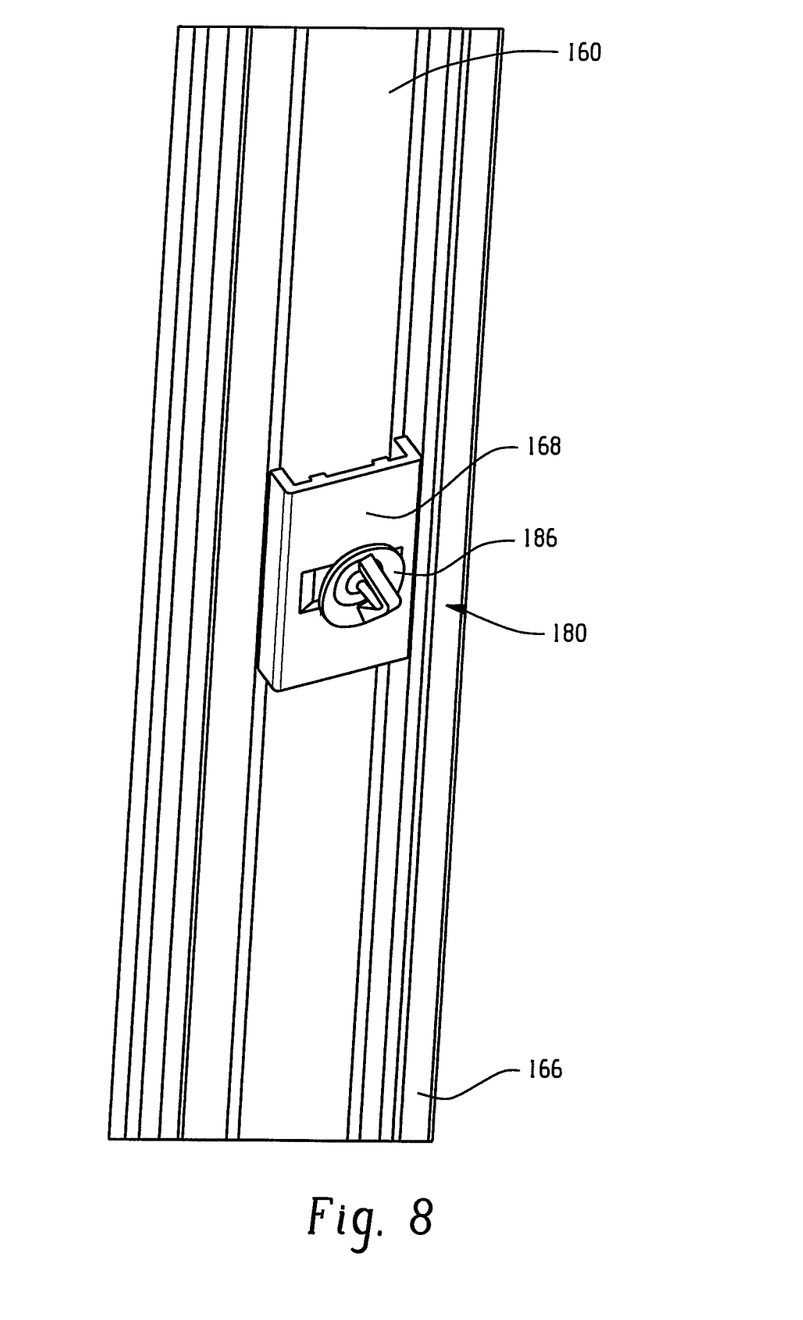
FIG. 8 is another enlarged view of the rear portion of the vehicle trim assembly shown in FIG. 6 with the fastener installed therein.

Along what is commonly referred to as a pillar 120 (e.g. a B pillar or C pillar) is provided a trim component identified as an appliqué assembly 130. Shown in FIG. 1 are two appliqués, both identified by reference numeral 130 so that description of one is applicable to the other unless specifically noted otherwise. The appliqué assembly 130 is individually illustrated in FIGS. 2-4 in an assembled state. FIG. 5, on the other hand, is an exploded view thereof that illustrates the individual components that are joined or assembled together to form the appliqué assembly 130. With particular reference to FIGS. 2-5, the interchangeable applique assembly 130 for use in connection with the associated vehicle 100 includes a base member or substrate 140 that is dimensioned for covering the pillar of the associated vehicle. Typically the pillar 120 of the vehicle is a metal structure and includes an opening 122 for receipt of a at least one fastener (to be described further below) for securing the appliqué assembly 130 thereto. The base member 140 is preferably a polymer construction such as a plastic component. A common plastic material for forming the base member 140 is any suitable polymer, and in one preferred embodiment is a polycarbonate, although it will be appreciated that any polymer that has sufficient rigidity and provides a substantially sturdy, protective covering over the metal pillar can be used. Although the base member 140 could be manufactured or formed as an extruded component with post extrusion manufacturing steps applied thereto, it is more likely that the base member is formed as a molded component that has at least one opening 142 therethrough. The opening 142 in the base member 140 is dimensionally aligned with the opening 122 in the pillar 120. The base member 140 has an overall dimension, i.e., a height and width, that covers or substantially covers the outer surface of the metal pillar 120. In addition, the metal pillar 120 preferably includes a recessed region 124 that receives a portion of the base member 140 therein (perhaps best illustrated in FIGS. 3 and 4). The base member 140 includes an inwardly turned edge 144 that extends along one vertical perimeter edge of the metal pillar 120. An opposite edge 146 of the base member 140 preferably includes a lip 148 that sealingly contacts a surface of the metal pillar adjacent the recessed region 124.

An applique insert 160 is received over at least a portion of the base member 140. The insert 160 is one of different inserts that may be alternately used in the appliqué assembly 130. The different inserts 160 are dimensionally similar to one another, interchangeable, and have different physical properties such as different materials or different surface finishes. For example, a first insert may be a metal or bright insert such as stainless steel, a second insert may be a high-gloss polycarbonate, while a third insert may be a low gloss polycarbonate, a high-gloss polycarbonite, mold in color, or molded two-shot low-gloss thermal plastic, etc. These are just examples of a variety of different physical features that may be employed in different, interchangeable applique inserts 160 and should not be deemed as a limitation to the present disclosure.

As shown in FIGS. 2-5, the interchangeable appliqué insert 160 has a height that is substantially the same as that of the base member 140; however, a width of the insert is less than that of the base member so as to cover only a portion thereof. In addition, the insert 160 includes an opening 162. The opening 162 of the insert 160 though does not extend entirely through the insert so that an outer or show surface 164 of the insert is continuous while an inner surface 166 includes a channel 168 that receives a clip 170. For example, the clip 170 may be integrally formed in the insert 160 or may be held or secured to the inner surface 166. The opening 162 is dimensionally similar to the openings 122, 142 in the vehicle pillar 120 and base member 140, respectively.

It is also preferable that each opening 122, 142, 162 is similarly shaped, shown here as a generally rectangular shape that has an elongated dimension in a first direction and a shorter dimension in a perpendicular, second direction. A fastener 180 includes a locking portion 182 that also has a generally rectangular shape for receipt through the aligned openings 122, 142, 162 when the elongated dimension of the locking portion is similarly oriented to the elongated dimensions of the respective openings. This allows the locking portion 182 of the fastener 180 to be advanced through the aligned openings, and then the fastener is rotated ninety degrees so that the locking portion of the fastener is received in a recess 184 in the clip (FIG. 6) and prevents inadvertent removal of the appliqué assembly 130 from the pillar 120. A head portion 186 of the fastener 180 also has an enlarged dimension to prevent advancement of the head portion through the aligned openings 122, 142, 162 whereby the fastener effectively secures the appliqué assembly 130 to the vehicle pillar 120.

It will also be appreciated that the seal lip 148 located on the edge 146 of the base member 140 could alternatively be provided on one of the base member and applique insert, i.e., the seal lip could be located and extend along a first perimeter edge of the applique insert.

This exterior appliqué assembly with interchangeable inserts allows flexibility and is designed to allow easy change of the insert to satisfy customer needs. For example, separate but interchangeable bright, high-gloss, or low gloss inserts for different styling requirements may be used with the remaining portions of the appliqué assembly being identical. The attachment clip or fastener allows for easy assembly of the components and the ability to automate, at least in part, this assembly. One of the applique inserts is aligned with the base member, and then the base member and applique insert are secured together (via the pin connection) to form a subassembly. The subassembly is subsequently shipped to the automotive assembly plant where the subassembly is then attached to the automotive vehicle.

This written description uses examples to describe the disclosure, including the best mode, and also to enable any person skilled in the art to make and use the disclosure. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims. Moreover, this disclosure is intended to seek protection for a combination of components and/or steps and a combination of claims as originally presented for examination, as well as seek potential protection for other combinations of components and/or steps and combinations of claims during prosecution.

It is claimed:

1. An interchangeable applique assembly for an associated vehicle comprising:
   a base member/substrate dimensioned for covering a pillar of the associated vehicle;
   an applique insert received on the base member and at least partially covering an outwardly facing surface of the base member;
   at least one fastener for securing the applique insert to the base member; and
   wherein the applique insert includes an opening dimensioned to receive the fastener, the opening has a greater dimension in a first direction than in a second direction whereby the fastener has an elongated base that is dimensioned for receipt through the opening in the first direction only, and the base member includes an opening therethrough that is dimensionally aligned with the applique insert opening so that the fastener is received through the base member opening and the applique insert opening, and the fastener secures the applique assembly to the associated vehicle.

2. The interchangeable applique assembly of claim 1, wherein the applique insert is one of dimensionally similar, at least first and second applique inserts having different surface finishes.

3. The interchangeable applique assembly of claim 2, wherein the at least one of first and second applique inserts are formed from dissimilar materials.

4. The interchangeable applique assembly of claim 1 wherein the base member includes an elongated recess dimensioned to receive the applique insert therein.

5. The interchangeable applique assembly of claim 4 wherein one of the base member and applique insert includes a seal lip extending along a first perimeter edge.

6. The interchangeable applique assembly of claim 4 wherein the fastener includes an elongated head that fits through aligned, similar shaped openings in the base member and the applique insert.

7. The interchangeable applique assembly of claim 6 wherein the applique insert has a first, outwardly facing surface and a second, inwardly facing surface that receives a clip that cooperates with the fastener.

8. The interchangeable applique assembly of claim 7 wherein the clip includes a groove that is dimensioned to receive the elongated head of the fastener and precludes inadvertent removal of the fastener once the elongated head is received therein.

9. An applique assembly for an associated automotive vehicle, the applique assembly comprising:
a base member having a first surface configured for covering receipt on an associated pillar of the vehicle, and a second surface facing outwardly from the vehicle, the second surface including an elongated recess; and
an applique insert received in the recess of the base member; and
a fastener securing both the base member and the applique insert to the vehicle pillar; and
wherein the base member includes an inwardly turned edge that extends along one vertical perimeter edge of the associated pillar, and one of the base member and applique insert includes a seal lip extending along a second perimeter edge to seal between the applique assembly and the vehicle pillar.

10. The applique assembly of claim 9 wherein the recess in the base member has a recess width less than a width of the base member.

11. The applique assembly of claim 9 wherein the base member includes an opening therethrough that receives the fastener.

12. The applique assembly of claim 11 wherein the base member opening has an elongated shape.

13. The applique assembly of claim 12 wherein the applique insert has an opening with an elongated shape that mates with the elongated shape of the base member opening.

14. The applique assembly of claim 13 fastener has an elongated head dimensioned for receipt through the elongated shaped openings of the applique insert and the base member when aligned.

15. The applique assembly of claim 14 wherein the applique insert has a groove disposed adjacent to and substantially perpendicular to the elongated dimension of the opening in the applique insert.

16. The applique assembly of claim 9 wherein the applique insert includes an opening dimensioned to receive the fastener, the opening has a greater dimension in a first direction than in a second direction whereby the fastener has an elongated base that is dimensioned for receipt through the opening in the first direction only, and the base member includes an opening therethrough that is dimensionally aligned with the applique insert opening so that the fastener is received through the base member opening and the applique insert opening, and the fastener secures the applique assembly to the associated vehicle.

* * * * *